United States Patent [19]

Stregack et al.

[11] 4,056,789
[45] Nov. 1, 1977

[54] ELECTRIC DISCHARGE GAS DYNAMIC LASER

[75] Inventors: Joseph A. Stregack, Silver Spring, Md.; Bernard L. Wexler, Arlington, Va.

[73] Assignee: The United States of America as represented by the Secretary of the Navy, Washington, D.C.

[21] Appl. No.: 693,592

[22] Filed: July 2, 1976

[51] Int. Cl.² .............................................. H01S 3/00
[52] U.S. Cl. ......................... 331/94.5 G; 331/94.5 D; 331/94.5 PE; 330/4.3
[58] Field of Search .................... 331/94.5 G, 94.5 D, 331/94.5 PE; 330/4.3

[56] References Cited

U.S. PATENT DOCUMENTS

| | | | |
|---|---|---|---|
| 3,886,479 | 5/1975 | Pearson | 331/94.5 G |
| 3,906,398 | 9/1975 | Low | 331/94.5 G |
| 3,940,710 | 2/1976 | Lemay | 331/94.5 PE |
| 3,991,384 | 11/1976 | Betts | 331/94.5 G |

OTHER PUBLICATIONS

Stregack et al., *IEEE Journ. of Quantum Electronics,* vol. QE-11, No. 8, Aug. 1975, p. 705.

Stregack et al., *Appl. Phys. Lett.,* vol. 27, No. 12, 15 Dec. 1975, pp. 670–671.
Peterson et al., *Journal of Appl. Physics,* vol. 46, No. 10, Oct. 1975, pp. 4570–4572.

*Primary Examiner*—Martin H. Edlow
*Attorney, Agent, or Firm*—R. S. Sciascia; Philip Schneider; Melvin L. Crane

[57] ABSTRACT

An electric discharge gas dynamic laser in which excitation of one gas species is obtained in a plenum by use of a dc glow discharge. The gas present in the plenum is then accelerated through an array of supersonic nozzles where the laser species is injected and mixed with the primary flow. Energy transfer and lasing occur in the supersonic region of the flow. Brewster-angle windows which extend from 1 to 28 cm downstream from the nozzle exit plane enables a laser cavity or diagnostic apparatus to be positioned at a variable distance downstream from the injection point. The optics may be mounted on a motor-driven translation table so that continuous scans of the region downstream of the nozzle exit plane may be conveniently made. The present facility may easily be operated with a subsonic cavity, with an RF discharge to augment the dc plenum discharge, with all gases premixed, or with any combination of these configurations.

18 Claims, 6 Drawing Figures

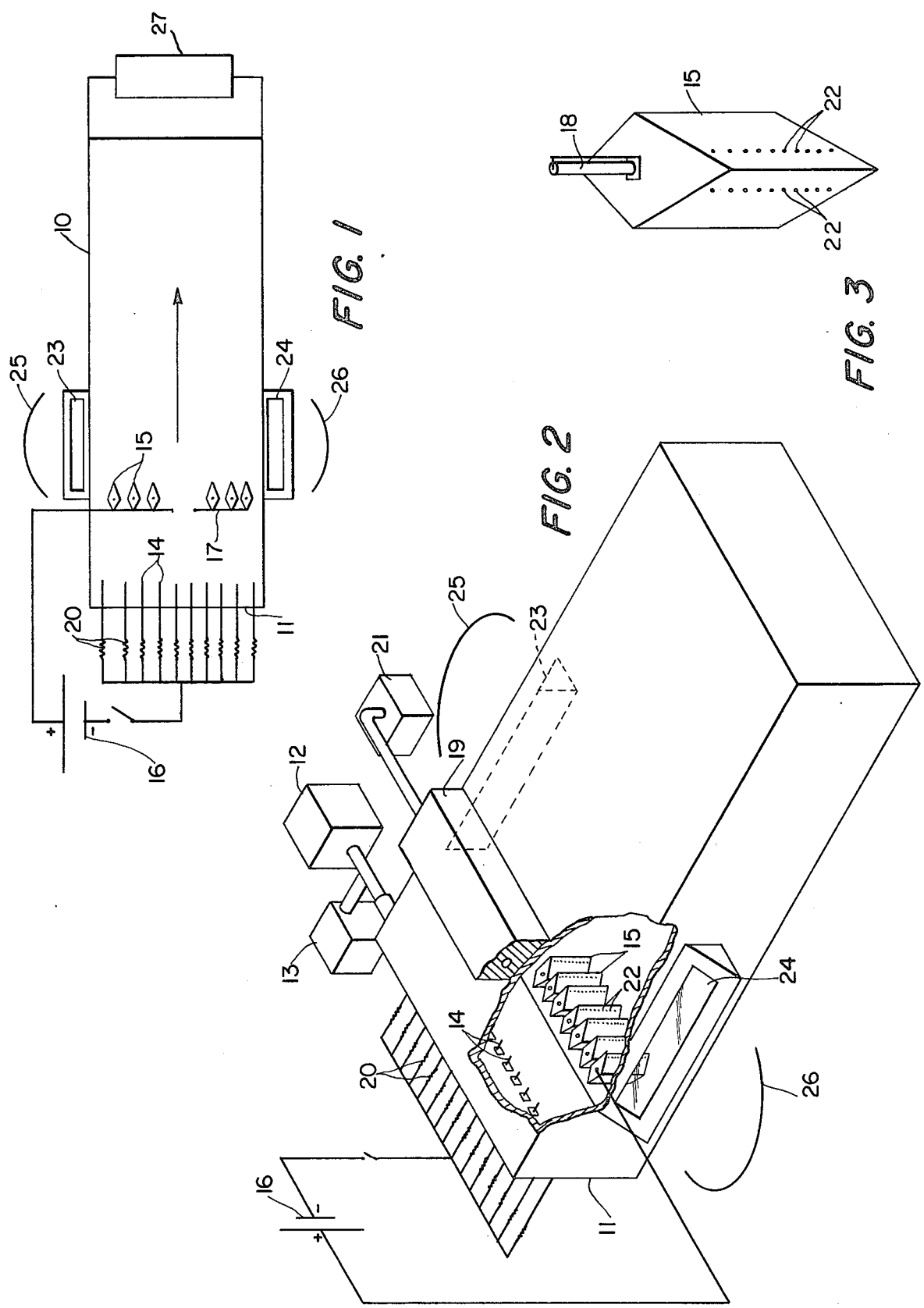

4,056,789

ELECTRIC DISCHARGE GAS DYNAMIC LASER

BACKGROUND OF THE INVENTION

This invention relates to gas lasers and more particularly to an electric discharge gas dynamic laser.

Heretofore previously reported gas lasers in which the excitation energy is supplied by an electrical discharge of some type have used either premixed gases or gases mixed under sonic or subsonic conditions. Previous systems of this type include those in which the lasing molecule receives its excitation energy directly from the electrical discharge and those in which some intermediate molecule, which has been excited by the discharge, and transfers its energy to the lasing species. In the latter case, previously existing systems have been operated with gases already mixed in the discharge region, or with the lasing species mixed with the previously electrically excited intermediate gas under subsonic or sonic conditions. In those devices in which all gases existed simultaneously in the discharge, the presence of the lasing species may be deleterious to the efficient deposition of energy into the intermediate gas, or limit it in some way. Conversely, the system may suffer from the effects of the discharge on the lasing species present, as through dissociation. Sonic or subsonic mixing of the laser species into the excited intermediate gas may not occur on a time scale fast enough to achieve the population inversion in a system with a short vibrational lifetime. Also, the rotational temperature of the gases may remain too high for optimal lasing conditions.

Previously, creation of $CO_2$ laser radiation has been accomplished through direct electrical excitation, after transfer from electrically or thermally excited $N_2$, or after transfer from chemically formed DF.

SUMMARY OF THE INVENTION

This is an electric discharge gas dynamic laser which utilizes energy transfer from a molecule easily excited in a discharge to another molecule whose vibrational excitation rate by electron impact is not favorable. The operation is such that the region where efficient vibrational excitation by electron impact of a molecule with favorable cross section occurs is physically separated from the region where gasdynamic conditioning and subsequent lasing occur.

The electric discharge gas dynamic laser of this invention has been described in the following articles: (1) "A New Electric Discharge Gas Dynamic Laser", by J. A. Stregack and B. L. Wexler, *IEEE J. Quantum Electronics,* QE-11, p. 705, August 1975; (2) "$D^2$—$CO_2$ and $D_2$—$N_2O$ Electric Discharge Gas-Dynamic Lasers , by J. A. Stregack, B. L. Wexler and G. S. Hart, Applied Physics Letters, Vol. 27, No. 12, pp. 670, 671, 15 Dec, 1975; and (3) C. W. CO—$CS_2$, CO—$C_2H_2$, and CO—$N_2O$ Energy Transfer Lasers, by J. A. Stregack, B. L. Wexler, and G. A. Hart, *Applied Physics Letters,* Vol. 28, No. 3 pp. 137–139, 1 Feb., 1976 which are incorporated herein by reference.

BRIEF DESCRIPTION OF THE DRAWINGS

FIG. 1 is a top view looking into the relative parts.

FIG. 2 is a side view in perspective which illustrates the relative parts.

FIG. 3 illustrates one of the nozzle elements.

DETAILED DESCRIPTION

Figure 4:
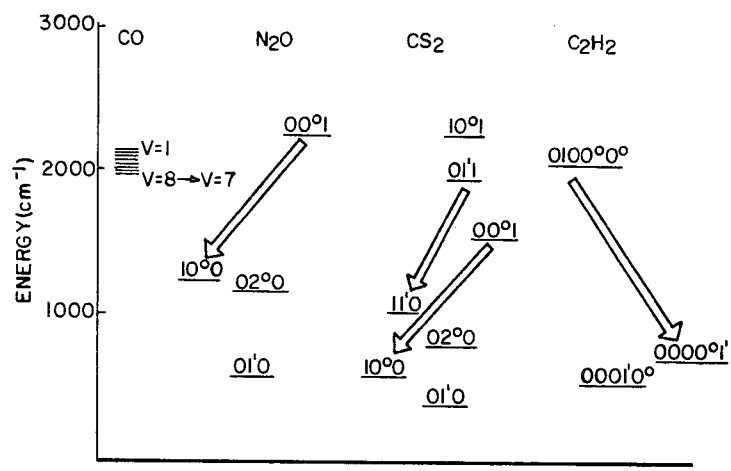
FIG. 4 illustrates a partial vibrational energy level diagram for the different laser transmitions as well as the energy for the first eight transitions in CO.

Now referring to the drawing, there is shown by illustration a top and a perspective view of the laser system. The system includes a housing 10 which includes a subsonic plenum, a nozzle section and a supersonic flow region. The plenum section extends from the rear wall 11 to the nozzle section. Means 12 and 13 are provided for injection of an intermediate gas and a dilutent gas into the plenum section. The plenum section also includes a plurality (at least nine) of individually ballasted (100 ohm resistors) stainless steel electrically conductive pins 14 which protrude from the back wall about 1½ inches toward an array of 34 copper supersonic wedge shaped nozzles 15 located about 5¾ inches from the back wall which makeup the nozzle section. A dc glow discharge between the individually ballasted stainless steel pins and the back of the nozzles is produced by a dc power supply 16 connected thereto. A radio-frequency discharge may be used instead of or in addition to the dc glow discharge and passed through opposing walls.

The nozzle section contains an array of a single row of uncontoured wedge shaped nozzle elements 15 which are secured side-by-side across the width of the housing and so positioned relative to each other that adjacent nozzle elements form a throat section 17 in which the throat measures 1.2 mm and the geometric area ratio of the expansion is 6. Each of the wedge shaped nozzle elements are provided with a gas inlet line 18 which extends upwardly through the upper wall of the housing each of which connect with a plenum chamber 19 from which the gas is feed to each of the nozzles. The gas is fed from a source 21 under pressure to the plenum chamber in order to maintain a supply for the nozzle array. Each of the nozzles are provided with a plurality of linearly aligned holes 22 across its height, which holes are located 4 mm downstream from the throat formed by two adjacent nozzles. Each of the nozzles are connected to the ground side of the dc power supply to produce an electrical discharge between the ends of the nozzles and the electrodes on the back wall.

The system is provided with oppositely disposed windows 23, 24 positioned in the same plane as the nozzle elements, at Brewsters angle with respect to a line perpendicular to the axis of the housing and the direction of the gas flow. The windows extend from 1 to 28 cm downstream from the nozzle exit plane. Axially translatable spherical mirrors 25, 26 are mounted opposite the windows to form the laser cavity. One mirror has maximum reflectivity whereas the other mirror is a nominally partially transmitting output mirror whose percent of transmittance gives the best output performance. The housing extends beyond the window and is connected with a suitable pump 27 for pumping the gases through the throats of the nozzle elements.

In operation, an intermediate gas such as $N_2$, $D_2$, $H_2$ or CO is admitted to the subsonic plenum section along with a diluent gas such as argon or helium. An electric discharge in the plenum section vibrationally excites the intermediate gas significantly populating the lower vibrational levels of this gas. The vibrationally excited intermediate gas and diluent are then supersonically expanded through the nozzle array in which the supersonic expansion lowers both the pressure and the rotational temperature. Simultaneous with passage of the vibrationally excited gas through the nozzle array, the laser species such as $CO_2$, $N_2O$, $CS_2$, or $C_2H_2$ is injected into the gas flow about 4 mm downstream of the throat. The intermediate gas and laser gas mix and flow into the supersonic flow region where the vibrational energy of the intermediate gas is transferred to the laser species. The mixing and energy transfer result in a population inversion between certain vibration-rotation levels of the laser gas, with subsequent laser oscillation occurring in the optical cavity whose axis is transverse to the gas flow axis in the supersonic flow region. All of the gaseous mixture then flows through a diffuser and are exhausted by a high capacity pump 27.

The laser species is removed from the discharge region thereby maximizing the channeling of electrical energy into vibrational energy without encountering possible limitations imposed by the laser species. Since the laser species is injected into the cold supersonic flow region, the following advantages for different potential laser systems are incurred: promotes anharmonic pumping of diatomic molecules, depopulates lower laser levels near the ground state in polyatomic molecules, improves mixing at lower pressures, decreases vibrational deactivation in the low-pressure supersonic flow, and increases the gain by decreasing temperature.

In carrying out the invention, the housing may be rectangular and made entirely of fiberglass or the subsonic plenum chamber may be made of Pyrex plates bonded together to which the nozzle and cavity sections made of anodized aluminum are attached. The subsonic plenum chamber may also be comprised of a row of glass tubes. A suitable housing is ¾ in. high × 10 in. wide × 19 in. long. The stainless steel electrode pins are individually ballasted 100 k ohms and have a length of 1½ in. extending toward the nozzle array. The nozzle array is located 5¾ inches downstream from the back wall to which the electrode pins are secured and suitably insulated therefrom. The nozzles are wedge shaped with the faces toward the plenum chamber of less length than the faces from which the laser gas is injected into the supersonic gas flow at a point 4 mm from the throat of the nozzles. The nozzle throat is 1.2 mm and the geometric area of the ratio of expansion is 6. The windows are placed at Brewster's angle and have a length up to 30 cm from the exit plane of the nozzle. The mirror cavity is formed with a maximum reflectivity dielectric mirror and a suitably transmitting output mirror depending on the lasing gas. Also, the mirrors may be mounted onto a moveable device so that the mirrors may be placed at different distances downstream from the exit plane of the nozzle array.

The above described laser system may be used for the operation of different types of lasers such as $D_2$—$CO_2$, $H_2$—$CO_2$, CO—$CS_2$, CO—$C_2H_2$, and CO—$N_2O$ cw energy transfer lasers. In these lasers, the second gas indicated is the laser species and the first gas is the intermediate pumping gas.

The following TABLE I illustrates the flow characteristics of a $D_2$—$CO_2$ laser.

TABLE I

| Flow characteristics of $D_2$-$CO_2$ laser | |
|---|---|
| Mach number | 2 |
| Plenum pressure | 53 Torr |
| Cavity pressure | 11 Torr |
| dc Discharge | |
| Voltage | 3 kV |
| Current | 0.8 A |
| Power output | 60 W |
| Peak small-signal gain | 0.016/cm |

TABLE II compares $D_2$—$CO_2$ and $N_2$—$CO_2$ laser performance under similar conditions in the above described system.

TABLE II

| | $N_2$—$CO_2$ | $D_2$—$CO_2$ |
|---|---|---|
| Total flow rate (moles/sec) | 1.11 | 1.29 |
| Fractional molar composition: $X_{He}$ | 0.74 | 0.64 |
| $X_{CO}$ | 0.05 | 0.06 |
| $X_{D_2}$ | — | 0.32 |
| $X_{N_2}$ | 0.21 | — |
| Elctrical efficiency | 3% | 2.5% |
| E/N (V cm$^2$) | $1.7 \times 10^{-16}$ | $1.0 \times 10^{-16}$ |

The above described system has been used to produce a $D_2$—$N_2O$ energy transfer laser operating on the $N_2O$ 10.7 μm transition. A comparison of the performance of the $D_2$—$CO_2$ and $D_2$—$N_2O$ lasers reflects the importance of available near-resonant vibrational levels for such energy transfer lasers. It has been determined that for identical He and $D_2$ flow rates and discharge conditions, roughly 3-5 times as much power can be extracted for a given injection rate of $CO_2$ than can be achieved from $N_2O$. This correlates well with a plausible description of the major energy transfer pathways in these two systems. $D_2$ with a $v = 1$ to $v = 0$ vibrational spacing of 2994 cm$^{-1}$ is in very close resonance with the $CO_2(01^11)$ level at approximately 3000 cm$^{-1}$. Rapid quenching of the $CO^2$ bending mode yields $CO_2$ in its $00^01$ state which subsequently undergoes stimulated emission to the $10^00$ level. This mechanism also applies to $N_2O$ which has a manifold of vibrational states similar to those of $CO_2$. However, there is one significant difference. The $N_2O(01^11)$ state at 2798 cm$^{-1}$ lies 200 cm$^{-1}$ below $D_2(v=1)$. Consequently, the favorable resonance between $D_2$ and $CO_2$ is not found in the case of $D_2$ and $N_2O$.

The successful use of electrically excited $D_2$ to pump a $CO_2$ laser through vibrational energy transfer, and the subsequent application of this technique to $N_2O$, indicates that this procedure can be used with many diatomic and polyatomic molecules whose vibrational spacing precludes efficient energy transfer from $N_2$. Among the many candidates of interest with vibrational levels which satisfy the criteria of near resonance with those of $D_2$ are HCl and HBr. In addition, the cooling effect makes possible improved cw lasing from $CS_2$ as well as producing a cw $C_2H_2$ laser, both of which have lower laser levels nearer the ground state than $CO_2$.

For the latter systems CO is premixed with He and is excited by a glow discharge in the subsonic plenum. This mixture is accelerated through the array of supersonic nozzles where the laser species is injected. Mixing, energy transfer, and lasing occur in the supersonic cavity region. Removing the laser species from the discharge region makes it possible to maximize the channeling of electrical energy into the long-lived vibrational mode of CO without encountering possible limitations imposed by the laser species (i.e., electron attachment, dissociation, etc.).

FIG. 4 is a diagram of the relevant energy levels for the laser transitions as well as the energy for the first eight vibrational transitions in CO. Both $CS_2$ and $C_2H_2$ have a lower laser level energies of approximately 700 cm$^{-1}$ and therefore have a thermal population which is 3.5% of the ground state at 300 K. The cooling effect of the supersonic expansion reduces this ratio to 0.6% at 200 K (the approximate translational temperature measured in this system when operated on $CO_2$) which can be critical in creating or enhancing any population inversion.

The results shown below are for laser operation at a fixed location 14 cm downstream of the nozzle exit plane. Typical flow conditions for each of the laser systems are summarized in TABLE III.

TABLE III

| | Flow conditions for different LASER systems | | | |
|---|---|---|---|---|
| Laser species | $N_2O$ | $CS_2$ | $CS_2$ | $C_2H_2$ |
| Fractional molar composition | | | | |
| $X_{He}$ | 0.86 | 0.85 | 0.83 | 0.85 |
| $X_{CO}$ | 0.11 | 0.13 | 0.15 | 0.13 |
| $X_{lasant}$ | 0.03 | 0.02 | 0.02 | 0.02 |
| Plenum pressure (Torr) | 88 | 129 | 116 | 127 |
| Cavity pressure (Torr) | 6.2 | 8 | 7.8 | 7 |
| Output coupling | 4% | hole (~0.1%) | 2% | hole (~0.1%) |
| Power output | 3.8W | 130mW | 450 mW | 100 mW |

In the CO—$N_2O$ system a cavity consisting of a maximum-reflectivity dielectric mirror and a nominally 4% partially transmitting output mirror is used. Laser output is approximately three-quarters of the power obtained on either a $N_2$—$N_2O$ or a $N_2$—$CO_2$ transfer laser run under similar flow rates and with similar energy deposition. The difference in $N_2O$ laser performance is believed to be due to the fact that more $N_2(v\rightarrow v-1)$ transitions have energies within kT of $N_2O$ (00°1) than do CO transitions.

Figure 5:
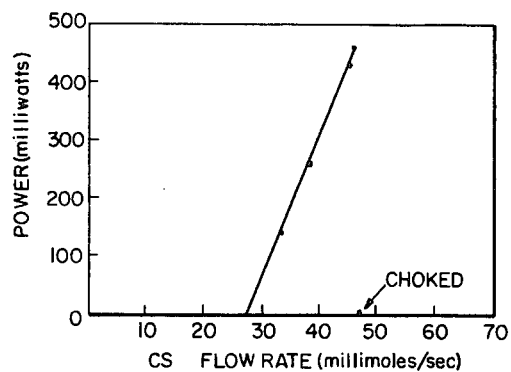
FIG. 5 illustrates graphically the laser power vs gas flow rate for a $CS_2$ laser.

For the CO—$CS_2$ laser, different systems using a 2% partially transmitting mirror and a maximum-reflectivity mirror with a 0.5-mm hole were used as output couplers. The 0.5-mm hole gives a geometric output coupling of approximately 0.1%. The variation of laser power with $CS_2$ flow rate is shown in FIG. 5. For the present flow conditions the 2% transmitting mirror gave the best laser performance. The laser would not operate with a 4% output coupler. From FIG. 5 it can be seen that for the present operating conditions, the laser power drops to zero at a $CS_2$ flow rate of 47 mmoles/sec. This is the result of a "choking" effect caused by excess secondary flow injection. This is not a fundamental limitation and can be overcome by redesigning the secondary injection scheme and/or by increasing the mass flow in the primary gas stream. The $CS_2$ laser operates near 11.5μm and most probably occurs between the (00°1) and (10°0) levels in $CS_2$ but could also occur between the (01¹1) and (11¹0) levels.

Figure 6:
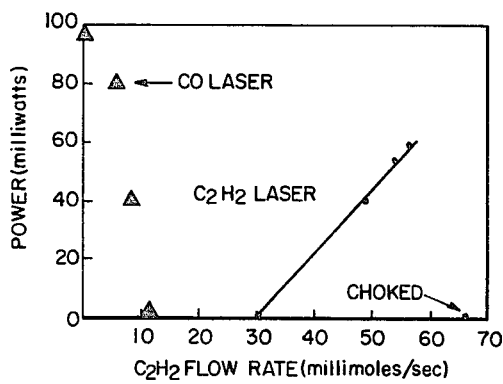
FIG. 6 illustrates graphically the laser power vs gas flow rate for a $C_2H_2$ laser.

The CO—$C_2H_2$ system used the maximum-reflectivity mirror with the 0.5-mm hole as the laser output coupler. The laser operates on the (0100°0°)–(0000°1¹) band at wavelengths slightly above 8μm. FIG. 6 gives laser power versus $C_2H_2$ flow rate. Note that because of the reflectivity and nonselectivity of the output mirror, the laser operates as a CO laser (for low $C_2H_2$ flow rates). CO laser power decreases and eventually ceases as vibrational energy is transferred from CO to $C_2H_2$.

Because the lower laser level in $C_2H_2$ is also near the ground state, lasing terminates when excessive secondary flow "chokes" the flow and raises the temperature.

Spectral regions of laser action have been determined by bandpass filters and confirmed by a monochromator with low resolution. The gases used were all commercial-grade (98% purity), while the $CS_2$ was vaporized from analytical reagentgrade liquid. Because of the purity of the gases, laser performance can possibly be affected by impurities. In fact, it has been determined in the CO—$C_2H_2$ tests that both CO and $C_2H_2$ lasing power decreased as the pressure in the gas cylinders dropped. This is believed to be due to the deleterious effect of $Fe(CO)_5$ which is present in the gas bottles and which will increase in molar concentration as the bottle pressure decreases. In addition, $C_2H_2$ is bottled with acetone as a stabilizer. Acetone has a strong absorption band centered at 8.2μm which also affects the $C_2H_2$ laser performance.

A $CO_2$ laser using transfer from $H_2$ vibrationally excited in the plenum has also been created. This is the first laser to use vibrationally excited $H_2$ as the intermediate gas. Transfer is believed to occur between $v = 1$ of $H_2$ at 4160 cm$^{-1}$ and a high lying combination level of $CO_2$, with subsequent deactivation to the 001 $CO_2$ level. Inefficiencies in this mechanism and/or rapid deactivation of the 001 $CO_2$ level by $H_2$ have resulted in the relatively poor performance of this laser.

The electric discharge gasdynamic laser offers the advantage that electrical excitation can be used for a laser in which the lasing species would (a) either limit or inhibit the discharge in some way, (b) be dissociated in the discharge, or (c) would not itself be readily excited in the discharge, or would have significant lower laser level excitation in the discharge. Furthermore, the present system has the advantages of a system using supersonic expansion, so that the gases will be cooled and rapidly mixed in the region downstream of the nozzle.

The device may be made of other materials than as described above and the conductive pins may be replaced by an array, supported by a fiberglass screen, which also serves to create turbulence in the gas in the plenum, assisting in the avoidance of arcs in the discharge.

The device clearly demonstrates that different gases may be readily vibrationally excited in an electric discharge and that the energy can be stored in the vibrational mode of the gas until it can be supersonically expanded through a nozzle array and a potential laser species mixed with it. For the diatomic laser species the lowering of the translational temperature by the gasdynamic expansion is necessary to promote anharmonic pumping which is advantageous for lasing.

The above described system uses vibrational excitation, transfer, and subsequent lasing to create infrared laser radiation. The exact same device may be used to create visible laser radiation if electronic state excitation is involved. In this case, the intermediate gas will be electrically excited to some metastable level, either a long-lived molecular electronic state or atomic electronic state. After the gasdynamic expansion, the intermediate gas will mix and transfer its energy to the laser gas, which will then have a population inversion between two electronic states, with subsequent lasing in the optical region of the spectrum. The laser species may be molecular or atomic. The important consideration in the choice of laser species is that the spontaneous emission rate from the upper laser level must be long compared to the mixing and transfer time for the intermediate and laser gases. Lasers involving V-E or E-V transfer may be possible in such a device.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. A CW laser system which comprises:
   a housing,
   said housing including a plenum section, a nozzle array section, and a constant area supersonic flow region,
   said plenum section including gas inlet for introducing an intermediate gas, and a plurality of conductive pins, said conductive pins extending axially toward said array and connected electrically to a dc power supply,
   said nozzle array section including a plurality of side-by-side noncontoured wedge shaped nozzles positioned to form a nozzle throat therebetween and connected electrically to ground,
   said nozzles including a plurality of gas outlet openings along their height downstream from the throat through which a lasing gas flows, and an inlet through which said lasing gas enters said nozzles;
   a plenum chamber to which each of said nozzle inlets are connected for supplying said lasing gas to said nozzles;
   a pump for pumping gases along the length of said housing from said plenum section and said nozzles;
   oppositely disposed windows in said housing extending downstream from the plane of said nozzle throat and positioned at Brewster's angle along the supersonic flow region; and
   a fully reflective spherical mirror opposite one window and a partially reflective mirror opposite the other window, whereby an optical cavity whose axis is transverse to the gas flow is formed between said mirrors and said mirrors are axially movable along the length of said windows.

2. A CW laser system as claimed in claim 1 in which:
   a diluent gas is mixed with said intermediate gas prior to introduction into said plenum section.

3. A CW laser system as claimed in claim 2 wherein:
   said diluent gas is Argon or Helium.

4. A CW laser system as claimed in claim 1 in which:
   said intermediate gas is deuterium ($D_2$) and the lasing gas is carbon dioxide ($CO_2$).

5. A CW laser system as claimed in claim 1 wherein:
   said intermediate gas is deuterium ($D_2$) and said lasing gas is nitrous oxide ($N_2O$).

6. A CW laser system as claimed in claim 1 wherein:
   said intermediate gas is carbon monoxide (CO) and said lasing gas is selected from carbon disulfide ($CS_2$), acetylene ($C_2H_2$), and nitrous oxide ($N_2O$).

7. A CW laser system as claimed in claim 3 in which:
   said intermediate gas is $D_2$ and the lasing gas is $CO_2$.

8. A CW laser system as claimed in claim 3 in which:
   said intermediate gas is $D_2$ and said lasing gas is $N_2O$.

9. A CW laser system as claimed in claim 3 in which:
   said intermediate gas is CO and said lasing gas is $CS_2$.

10. A CW laser system as claimed in claim 3 in which:
    said intermediate gas is CO and said lasing gas is $C_2H_2$.

11. A CW laser system as claimed in claim 3 in which:
    said intermediate gas is CO and said lasing gas is $N_2O$.

12. A CW laser system as claimed in claim 3 in which:
    said intermediate gas is $H_2$ and said lasing gas is $CO_2$.

13. A CW laser system which comprises:
    a housing,
    said housing including a plenum section, a nozzle array, and a constant-area supersonic flow region,
    said plenum section including a gas inlet for introducing a desired gas, and a plurality of conductive pins extending into said plenum section,
    said nozzle array section including a plurality of side-by-side nozzles positioned to form a nozzle throat therebetween and connected electrically to ground,
    said nozzles including a plurality of gas outlet openings aligned along their height downstream from the throat through which a lasing gas flows, and an inlet through which said lasing gas enters said nozzles;
    a pump for pumping gases along the length of said housing from said plenum section and said nozzles;
    oppositely disposed windows in said housing extending down stream from the plane of said nozzle throat and positioned at Brewster's angle with respect to said supersonic flow region; and
    a fully reflective spherical mirror opposite one window and a partially reflective mirror opposite the other window, whereby an optical cavity whose axis is transverse to gas flow through said supersonic flow region is formed between said mirrors.

14. A CW laser system as claimed in claim 13 which includes:
    a plenum chamber to which each of said nozzle inlets are connected for supplying a lasing gas to said nozzles.

15. A CW laser system as claimed in claim 13 in which:
    said mirrors are axially movable along the length of said window.

16. A CW laser system as claimed in claim 13 in which:
    said conductive pins extend in an axial direction toward said nozzle array.

17. A CW laser system as claimed in claim 16 in which:
    said conductive pins are connected electrically to a dc power supply.

18. A CW laser system as claimed in claim 17 in which:
    each of said nozzles are noncontoured double-wedge-shaped with the ends of the wedges in the axial direction of said housing.

* * * * *